(12) United States Patent
Arbisi et al.

(10) Patent No.: US 7,050,293 B2
(45) Date of Patent: May 23, 2006

(54) FOLDABLE MOBILE STATION WITH NON-CYLINDRICAL HINGE

(75) Inventors: Tom Arbisi, Newbury Park, CA (US); Morten Pontoppidan, Greve (DK); Peter B. Knudsen, Copenhagen K (DK); Atle Messel, Copenhagen OE (DK)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/887,796

(22) Filed: Jul. 9, 2004

(65) Prior Publication Data

US 2005/0054395 A1 Mar. 10, 2005

Related U.S. Application Data

(60) Provisional application No. 60/485,872, filed on Jul. 10, 2003.

(51) Int. Cl.
*H05K 7/20* (2006.01)
*H05K 5/00* (2006.01)
*G06F 1/16* (2006.01)

(52) U.S. Cl. ............... 361/681; 361/680; 455/575.3

(58) Field of Classification Search ............ 361/679, 361/680, 681, 683; 455/575.1, 575.3, 899; 16/281, 286; D14/341, 345, 346, 347, 138
See application file for complete search history.

(56) References Cited

U.S. PATENT DOCUMENTS 4,731,904 A * 3/1988 Sprague .................... 16/286
5,890,052 A * 3/1999 Read et al. ............... 455/575.3
6,217,975 B1 4/2001 Daton-Lovett
6,431,271 B1 8/2002 Thomeer et al.
6,658,275 B1 * 12/2003 Hantunen et al. ........ 455/575.3
2004/0203507 A1 * 10/2004 Newman et al. ........... 455/90.3

OTHER PUBLICATIONS

"Mobiledia Samsung SGH-S105 Review", Allen. Dec. 24, 2002 (http://www.mobiledia.com/reviews/samsung/sgh-s105/page1.html).*
"Samsung SGH-S105 User Guide". GH68-03087A Rev. 1.1 (http://www.samsungtelecom.com/pdf/s105.pdf).*
U.S. Appl. No. 10/826,781, filed Apr. 16, 2004, In re: Holtorf et al., entitled "Bi-Stable Hinge and Systems Using Same".
U.S. Appl. No. 10/826,781, filed Apr. 16, 2004, In re: Holtorf et al., entitled "Bi-Stable Hinge and Systems Using Same".

* cited by examiner

*Primary Examiner*—Anatoly Vortman
*Assistant Examiner*—Corey Broussard
(74) *Attorney, Agent, or Firm*—Alston & Bird LLP

(57) ABSTRACT

A novel folding design for a mobile station is disclosed that provides a stylish design, a simplified assembly, and relatively few parts. The improved foldable mobile station comprises a flexible front cover, multiple functional units coupled together by a folding hinge and a tension unit. The tension unit provides a compressive force to the pivotally attached functional units thereby biasing the foldable mobile station between open and folded positions.

37 Claims, 15 Drawing Sheets

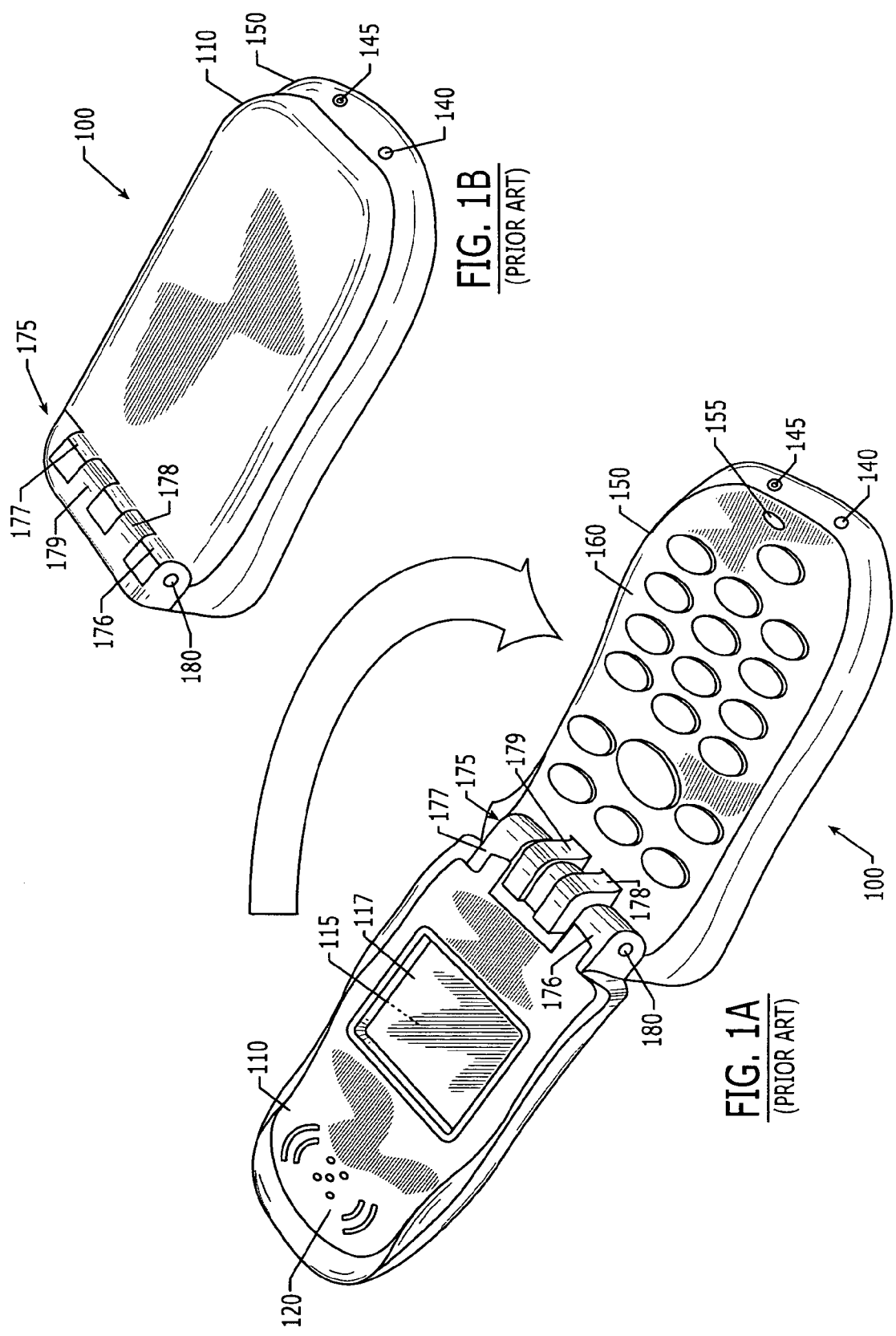

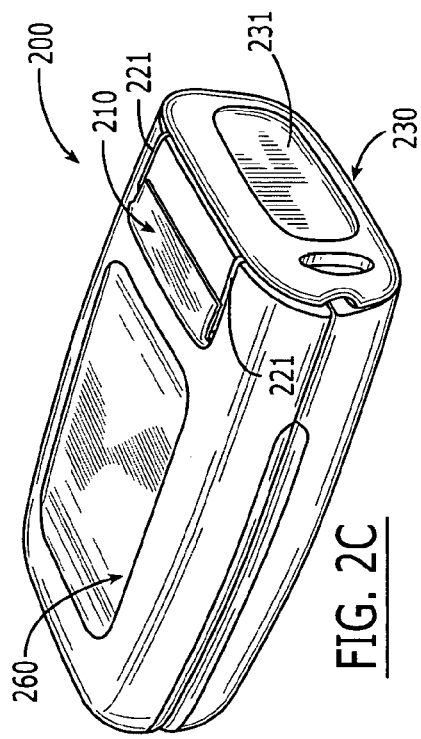
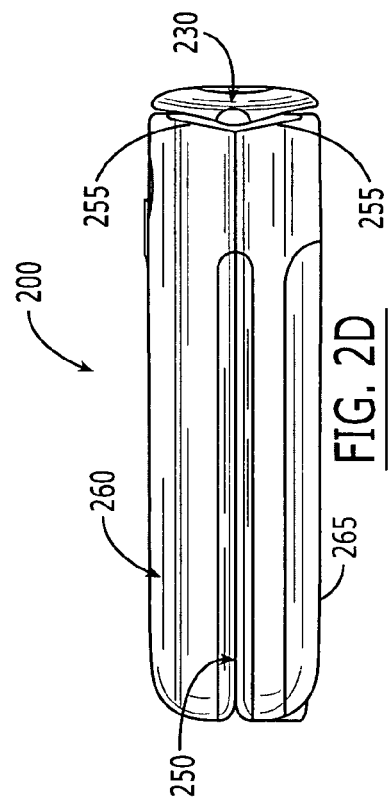
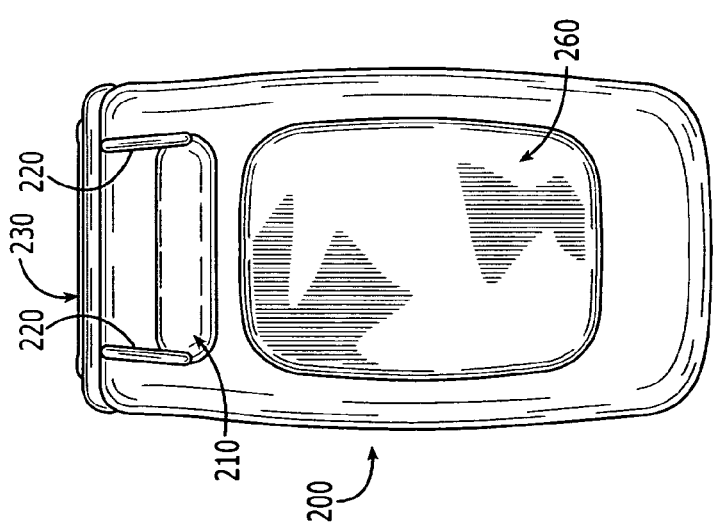
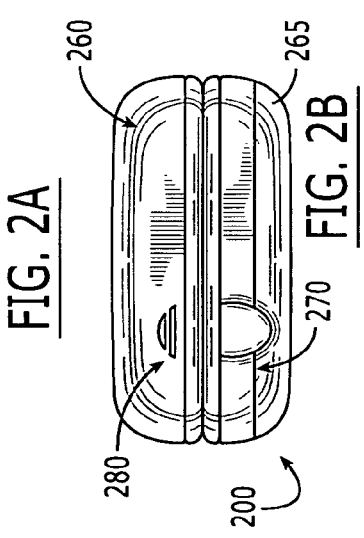

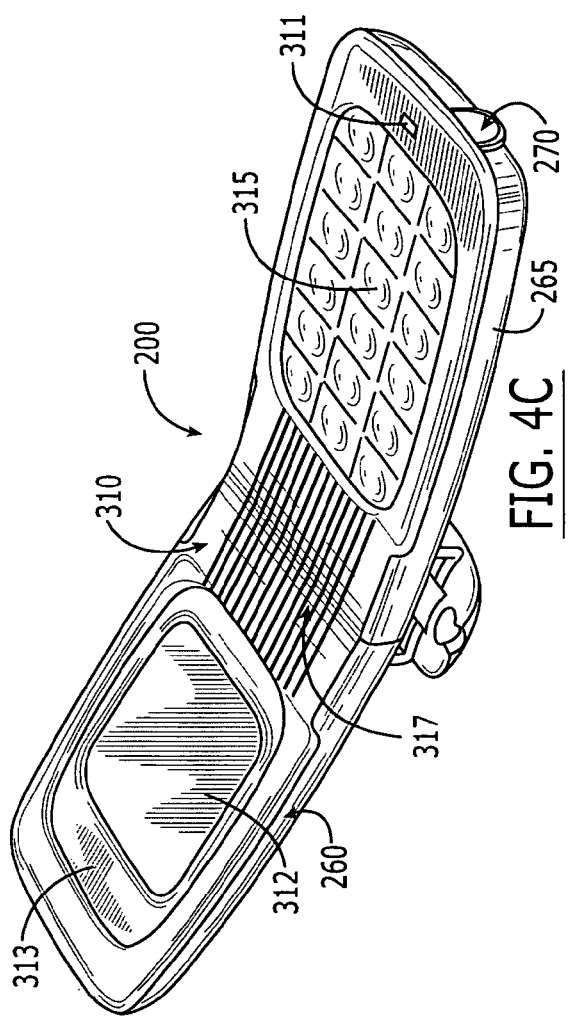
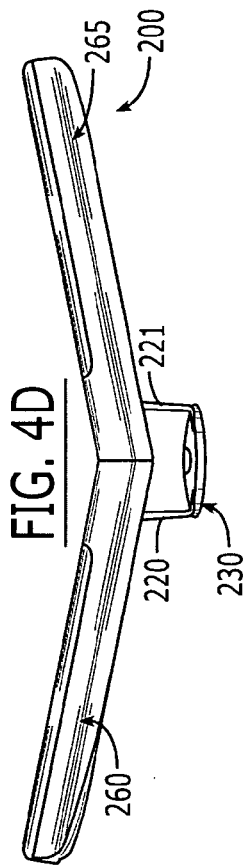
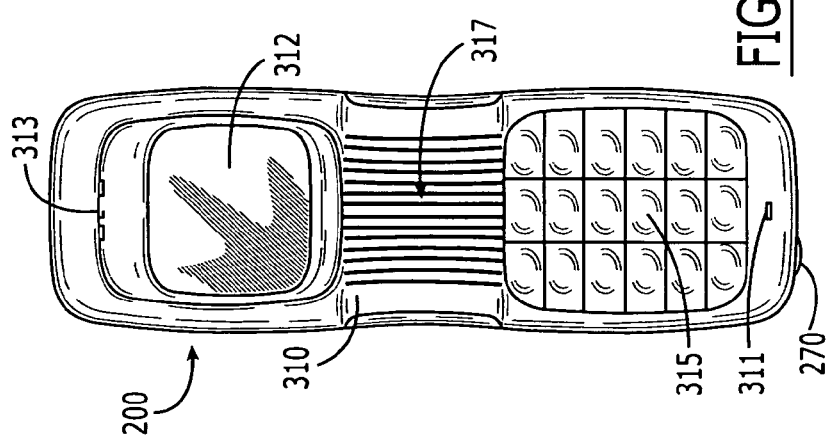
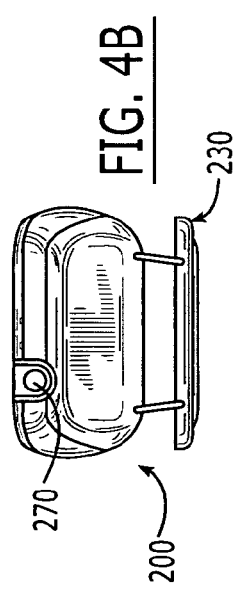
FIG. 4C
FIG. 4D
FIG. 4A
FIG. 4B

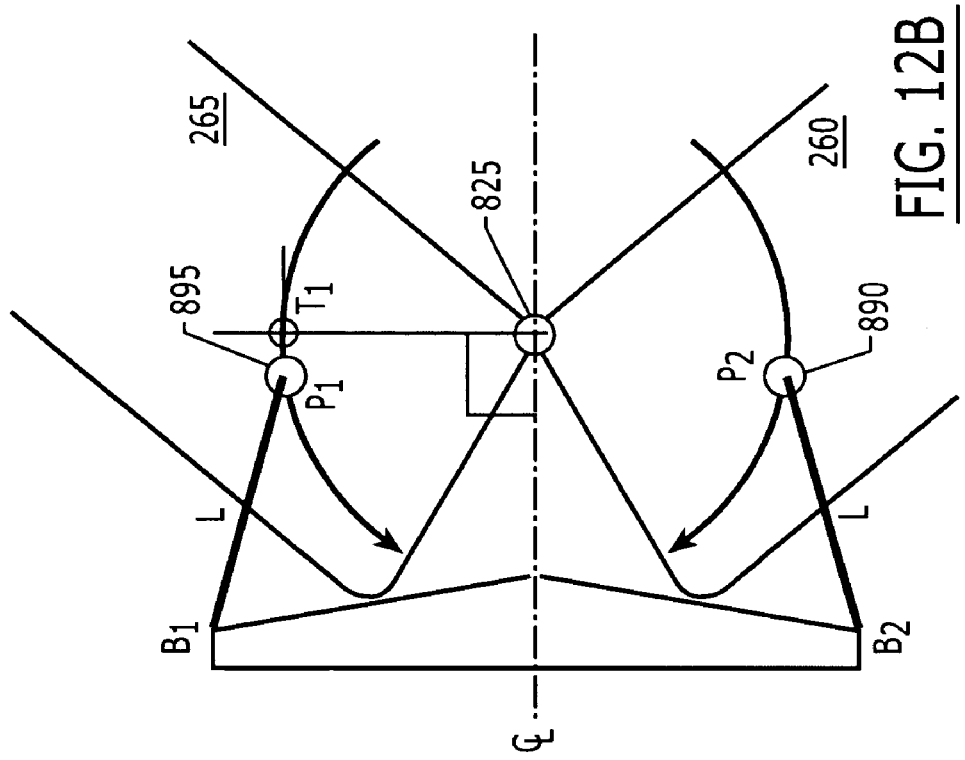
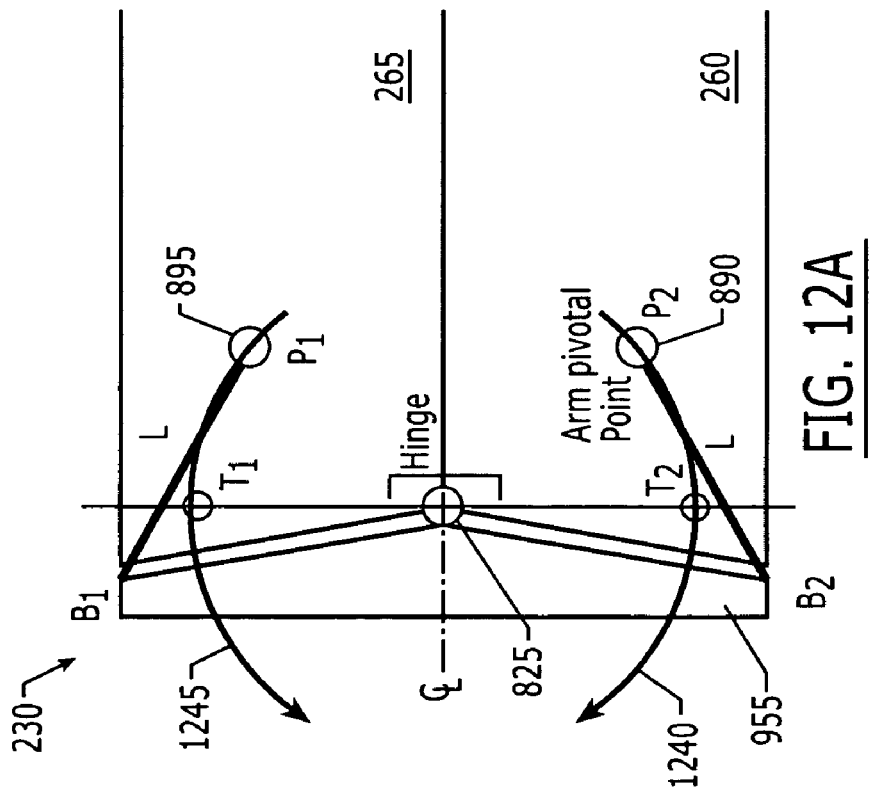
FIG. 12B
FIG. 12A

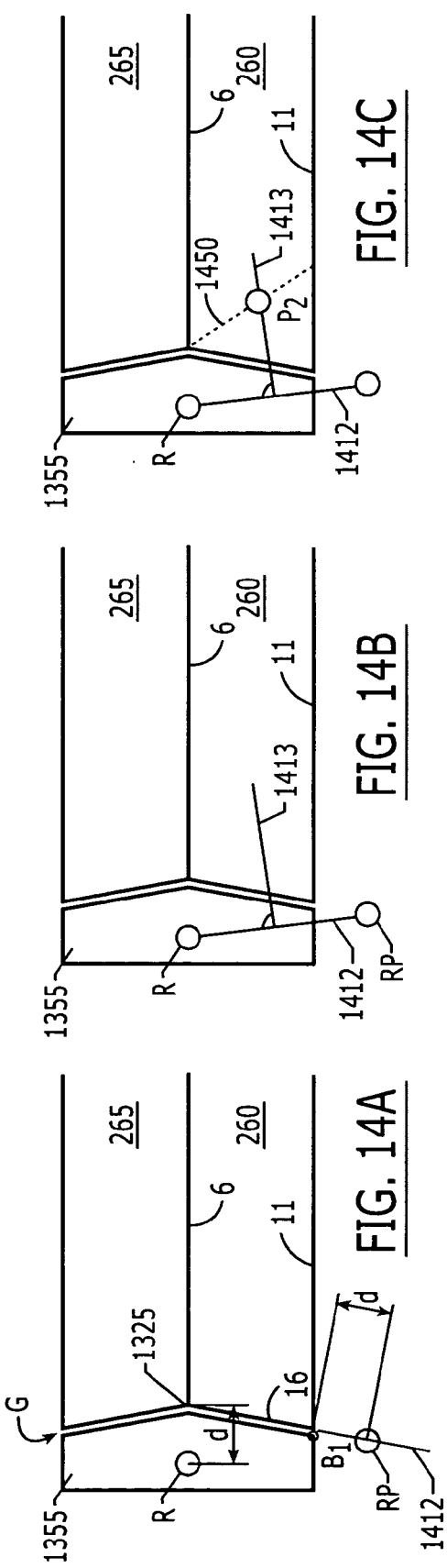

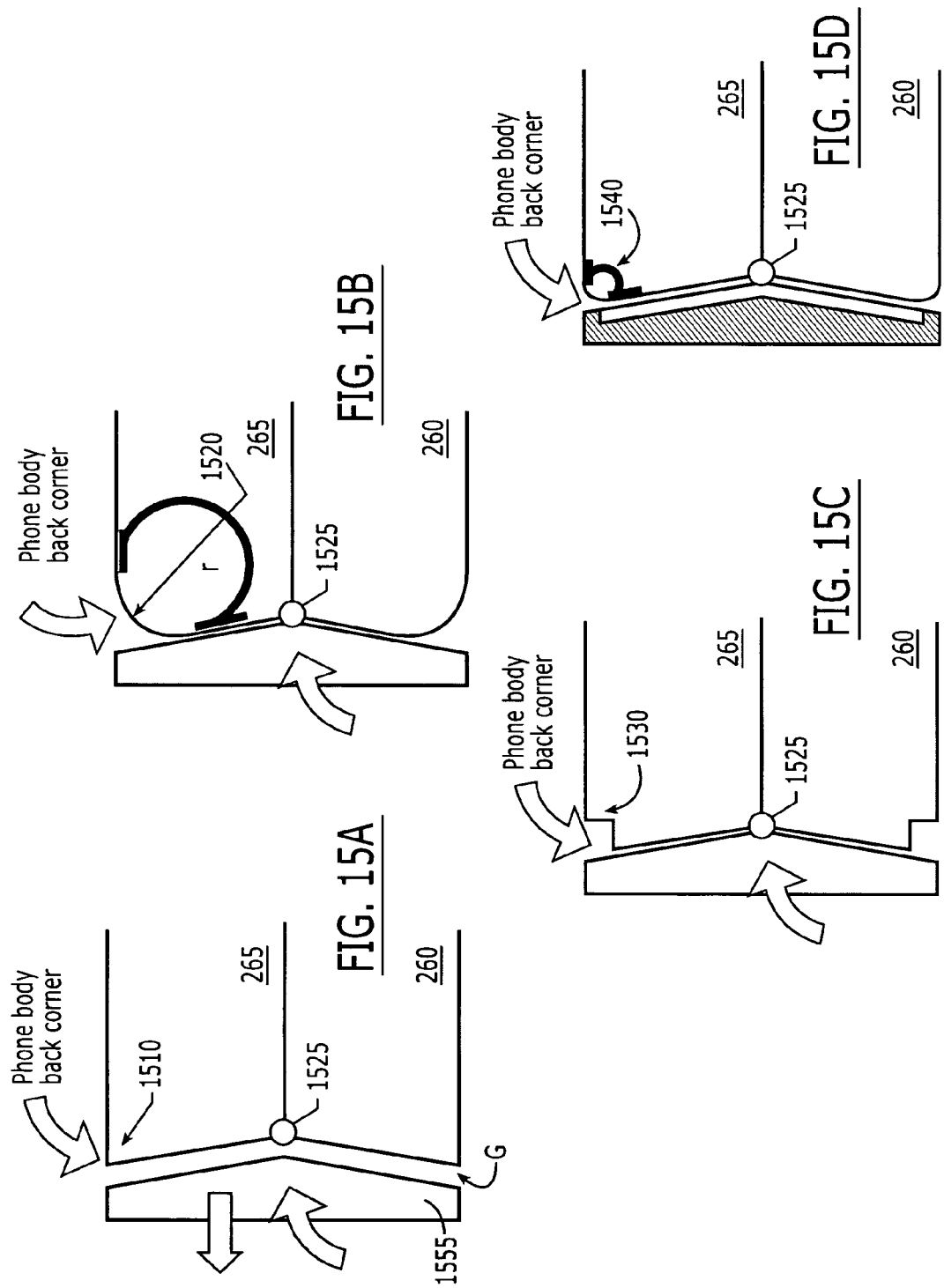

FOLDABLE MOBILE STATION WITH NON-CYLINDRICAL HINGE

CROSS-REFERENCE TO RELATED APPLICATIONS

The present application claims priority to U.S. Provisional Application. No. 60/485,872 filed Jul. 10, 2003; the contents of which are incorporated herein in their entirety.

FIELD OF THE INVENTION

The present invention relates generally to mobile-stations, and more specifically to a mobile station having a folded design encompassing an external tension device.

BACKGROUND OF THE INVENTION

The manufacture and design of today's mobile stations (also known as mobile phones, PDAs, pagers and the like) are constantly evolving. Early mobile station designs were necessarily large and bulky. The radio communications equipment and battery units necessary for their operation, generally were carried in one oversized unit; although in at least one early and cumbersome design the unit was actually divided into two pieces which were then connected by a power cable. Advances in integrated circuitry and electricity storage technology have enabled mobile station designers to create smaller and smaller devices. These instruments are not only lighter, but also less cumbersome and easier to transport. For example, mobile stations are no longer required to be permanently installed in automobiles or connected to bulky separately-carried battery packs. Essentially, today's smaller, more useful mobile stations have simply become more fashionable.

Unfortunately, several drawbacks have followed this new fashionability and convenience. For example, the increased mobility of today's mobile stations has the unintended drawback of subjecting the mobile station to an ever-increasing number of potentially damaging environments. For modern day consumers, these environments include pockets, briefcases, purses, gym bags, glove compartments and toolboxes where the delicate components of the mobile station could potentially contact harmful solid objects and be subjected to moisture. To make matters worse, market forces continue to drive mobile stations smaller, therefore, making it more difficult to protect the sensitive mobile station componentry with heavy-duty structural reinforcements. Accordingly, modern mobile stations are gradually becoming more vulnerable to damage.

This risk of damage is exacerbated by the number of externally accessible components that are provided on modern mobile phones. One of the most prominent of these components is the visual display. Initially, such displays were limited to small, light emitting diodes (LEDs) that indicated whether the phone was on or whether a call was in progress. Gradually, more advanced LED displays were developed that were capable of displaying a dialed telephone number, the current time, or other simple information. More recently, liquid crystal displays (LCDs) have become commonplace. An LCD is made by sandwiching an electrically sensitive liquid-crystal material between two very thin pieces of glass or other transparent materials. They are, therefore, easily susceptible to damage by even a relatively minor impact. Despite the hard, transparent cover or similar protective device, generally added to limit this vulnerability, LCDs remain one of the most easily damaged components in modern mobile stations.

One solution offered to provide greater protection for modern mobile stations is the bifold design. A bifold mobile station is one-that may be, generally speaking, folded in half. That is, the instrument is typically made up of at least two parts that are electrically connected together, each part housing a portion of the mobile station's internal components. For the purposes of this application, the term "folded in half" is used in a general sense, that is, the two "halves" are not necessarily equal in size. There may even be more than two "halves" although such a design is not typical. Traditionally, the two halves of a mobile station are held together by a hinge that is "opened" when the device is used. Opening the mobile station in a clam-shell type fashion, reveals its LCD and keypad, which would otherwise remain folded inside the unit when closed for storage. Foldable mobile stations may be safely tucked into a pocket or purse, or clipped to a user's belt, while the device's most impact-sensitive components are protected by a hard plastic shell.

FIGS. 1A, 1B, and 1C depict a folded mobile station according to the known prior art. Specifically shown, is a mobile station 100 having a first portion 110 and a second portion 150. The first portion 110 houses an LCD 115. The LCD 115 is visible through, and protected by, a clear plastic cover 117. A speaker port 120 is comprised of a series of small openings formed in first portion 110, and lies adjacent to an internal speaker (not shown) that is also housed by the first portion 110. Further, the first portion 110 also typically includes circuitry for driving the LCD 115 and the internal speaker (not shown).

The second portion 150 of a conventional mobile station 100 generally includes a microphone port 155 that is adjacent to an internal microphone (not shown). A keypad 160 is also provided that is comprised of a series of keys extending through a plurality of openings from an otherwise internally disposed key mat. As with the first portion 110, the second portion 150 of mobile station 100 also houses the internal circuitry associated with the above described microphone and keypad. An antenna for facilitating radio frequency (RF) communications may be located in either the first portion 110 or the second portion 150, or may be distributed between them. Mobile station batteries (not shown) are typically stored in the second portion 150, due to the limited space available in the first portion 110 as a result of the LCD 115 and speaker 120 placement. An external power supply (not shown), such as an AC adaptor, may be connected through a power port 140. Similarly, external headphones (not shown) may be connected to the mobile station 100 at the external-device port 145.

Conventional folding mobile stations 100 use a cylindrical hinge 175 similar to a standard door hinge, to bind the first portion 110 to the second portion 150. Manufacturing mobile stations having hinges of this type requires a complex assembly process wherein an axle or pin 180 is inserted into the hinge and a flexible ribbon cable 185 is then awkwardly wrapped around it. Typically, conventional mobile stations 100 also include a pre-assembled detent mechanism 184 that holds the station in open and folded positions.

FIG. 1C illustrates a conventional folding mobile station hinge as described above. The hinge 175 is formed from hinge members 176 and 177 that extend from the first portion 110 and the hinge members 178 and 179 that extend from the second portion 150. The two sections are held together by a hinge pin 180 that extends through openings formed in hinge members 176 through 179. If placed in the orientation illustrated in FIG. 1A, the mobile station 100 is generally ready to operate. When the mobile station is thus "opened," the user has access to the keypad 160 and can conveniently place the speaker port 120 and microphone port 155 in a position for voice communication. The mobile station 100 may also be "closed" by folding the first portion 110 to meet the second portion 150 in a clam-shell action as indicated by the arrow. FIG. 1B illustrates a known mobile station 100 in the folded position. Advantageously, the first portion 110 and the second portion 150 close in such a manner as to protect the keypad 160 and LCD 115. Generally speaking, known mobile stations 100 cannot be used in a folded configuration, although such functionality may be achieved by employing an external microphone and speaker (not shown). Such devices are often used in 'hands-free' operation, and are readily connected through an external-device port 145. As alluded to above, the folded design of modern mobile stations 100 distinguish them from their predecessors by accommodating safe storage on belts, in pockets, purses, or glove compartments without subjecting the sensitive internal components to damage from keys or other objects frequently encountered in such environments.

As should by now be apparent, folded mobile stations possess features that are both useful and desirable to consumers. In addition to the durability improvements discussed above, many users prefer folding designs over others, based on pure aesthetics. Despite the above improvements, the conventional folding design depicted in FIGS. 1A and 1B is still not optimum. Like many early designs, conventional folded mobile station designs employ overly complex hinges of the type illustrated in FIG. 1C and are accordingly costly to manufacture. Additionally, the known cylindrical hinge design discussed above provides little or no latitude for alteration or aesthetic improvement.

In light of the foregoing, it would be highly desirable to produce an improved foldable mobile station having a minimum of internal hinge components while maintaining a robust, durable design. Furthermore, it would be desirable to provide a hinge that is relatively simple to assemble and serves to compliment the overall aesthetic appeal of the mobile station.

BRIEF SUMMARY OF THE INVENTION

The above and other objects are met and other advantages are achieved by the present invention, which includes a novel folding design for a mobile station accommodating an improved hinge design having fewer parts and a simpler, more cost effective assembly. Specifically, the improved mobile station according to the present invention, includes a flexible front cover, and multiple functional units coupled together by an improved hinge that is biased by an external tension unit. More precisely, the tension unit biases the functional units toward open and folded positions, while freeing usable space within, and on the surface of the mobile station.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

The above and other features, objects, and advantages of the invention will become apparent from the following description of certain preferred embodiments thereof, when taken in conjunction with the accompanying drawings in which:

FIGS. 1A, 1B, and 1C are isometric views of a typical folding device according to the known prior art with FIG. 1A showing a conventional mobile station in an open configuration, FIG. 1B showing the device in a folded configuration, and FIG. 1C showing a representation of the prior art cylindrical mechanical hinge system.

FIGS. 2A, 2B, 2C, and 2D provide orthographic and perspective views showing a "closed" mobile station built in accordance with embodiments of the present invention.

FIG. 3 is an exploded view showing six components of a mobile station in accordance with embodiments of the present invention.

FIGS. 4A, 4B, 4C, and 4D provide orthographic and perspective views depicting an "open" mobile station in accordance with embodiments of the present invention.

FIG. 12 is a geometrical representation of the relative movement of the components depicted in FIG. 11.

FIG. 14 illustrates a method for constructing angle bisecting lines and meridian lines so as to derive appropriate spring pivot points in accordance with one embodiment of the present invention.

FIG. 15 illustrates the relative interaction between the back plate and the mobile station in accordance with several embodiments of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Those skilled in the art, after reading the specification, will understand that the principles of the present invention may be implemented in a variety of similar electronic device applications, in addition to the devices specifically discussed herein. That is, while the illustrated embodiment of the present invention depicts a folding design for a mobile station, such as a mobile phone, it is equally suitable for other similar devices such as lap-top computers, personal digital assistants (PDAs), and the like. As mentioned above, for convenience such devices and those like them will herein be referred to generically as "mobile stations."

As described in detail above, conventional mobile stations of the type illustrated in FIG. 1 typically employ a cylindrical hinge that provides a somewhat awkward mechanical appearance. This appearance generally persists regardless of the mobile station manufacturer or specific application (e.g., mobile phone, PDA, lap top computer, etc.). The present invention provides a functionally, structurally and aesthetically improved folding mobile station. Further, it provides a manufacturer with greater design freedom by accommodating a continuous surface between its two halves when the mobile station is placed in an open position.

Figure 1C:
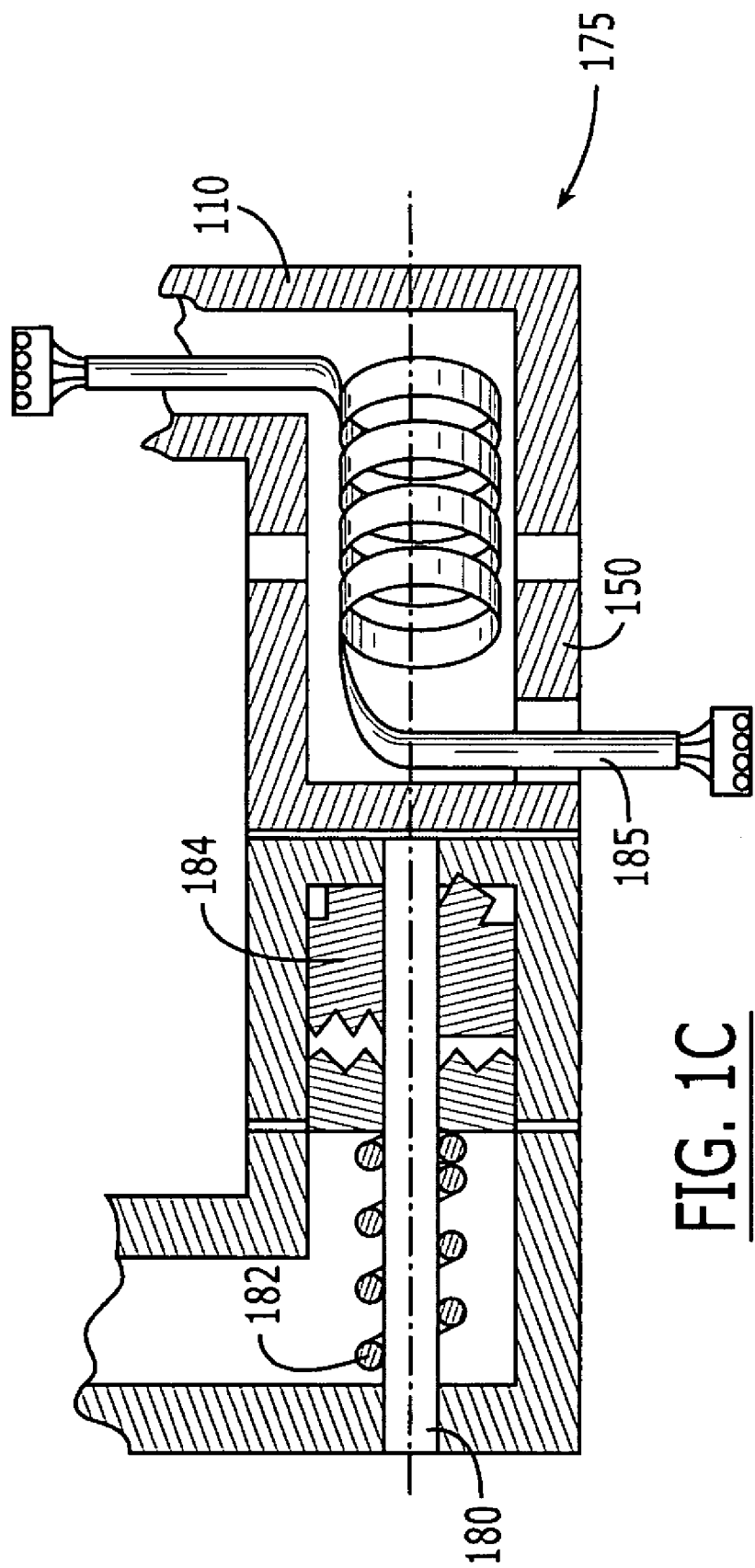

The present invention also significantly limits manufacturing costs. Specifically, the present invention reduces the number and complexity of necessary parts and further reduces cost by simplifying the manufacturing process. As shown in FIG. 1C, conventional hinges require the precise insertion of a small hinge pin 180 through internal hinge components such as a tension spring 182, static and dynamic detent assemblies 184 that bias the station in open and folded positions, and finally through an awkwardly wrapped electronic ribbon 185 that electronically connects the first 110 and second portions 150 of conventional mobile stations. The present invention advantageously eliminates this problematic "threading" of the hinge pin 180 while simultaneously streamlining the hinge design by eliminating many of the above internal hinge components including, the hinge pin 180 itself, the internal spring 182, and the internal static and dynamic detent assemblies 184. Further, the improved mobile station eliminates the awkward wrapping of the electronic ribbon 185 and allows for a simpler z-axis assembly of the hinge itself.

FIGS. 2A to 2D are orthographic and perspective views showing a folded mobile station 200 built in accordance with one embodiment of the present invention. The mobile station 200, shown folded, has two body units 260, 265 that may be constructed, for example, of a rigid polymer shell so as to add structure and durability. The mobile station 200 also includes a tension unit 230 generally provided at the attachment point between body units 260, 265. The tension unit 230 provides a biasing force to the rigid body units 260, 265 so as to maintain the mobile station 200 in open and folded positions. A flexible cover 250 is provided, as described in detail below, for providing a continuous visual transition from the inner surfaces of the two body units 260, 265. When folded, as shown, the elastomer material that comprises a preferred flexible cover 250 may provide a tactical gripping surface to aid when opening a folded mobile station 200.

In one embodiment, the tension unit 230 may be attached to body units 260, 265 via mounting structures 220, 221. As described below, the mounting structures 220, 221 extend from the tension unit 230 into attaching slots located on the body units 260, 265. An attachment plate 210 covers the slots and prevents the mounting structures 220, 221 from becoming detached. As will be apparent to one of ordinary skill in the art in view of the foregoing, the tension unit 230, in conjunction with a folding hinge (not shown), pivotally connects the body units 260, 265 and biases the units between open and folded positions. Additionally, the tension unit 230 may optionally provide a surface 231 displaying visual indicia such as a fixed advertisement, a stamped logo, or the like. In yet another embodiment, the tension unit 230 could provide a dynamic outer surface including a display 231 connected to operational elements within the mobile station 200. In mobile phone applications, the display 231 may present important user information, such as a pending call or a number of queued messages. This information could be provided to users in any manner of audio/visual media (e.g., LED, LCD) that is commonly known in the art.

The body of the tension unit 230 may be comprised of various materials including, for example, plastic or other polymer materials, metals, and the like. For aesthetic or other purposes, the edges of the tension unit 230 may be tapered to fit flushly into one or more receiving surfaces 255 of body units 260, 265, as illustrated in FIG. 2D. A power interface 270 may optionally be provided to receive an external signal or battery charger cable, as illustrated in FIG. 2B. Grooves 280 may also be provided on the body units 260, 265 in order to provide a non-slip or tactile gripping area to open the mobile station 200.

Figure 3:
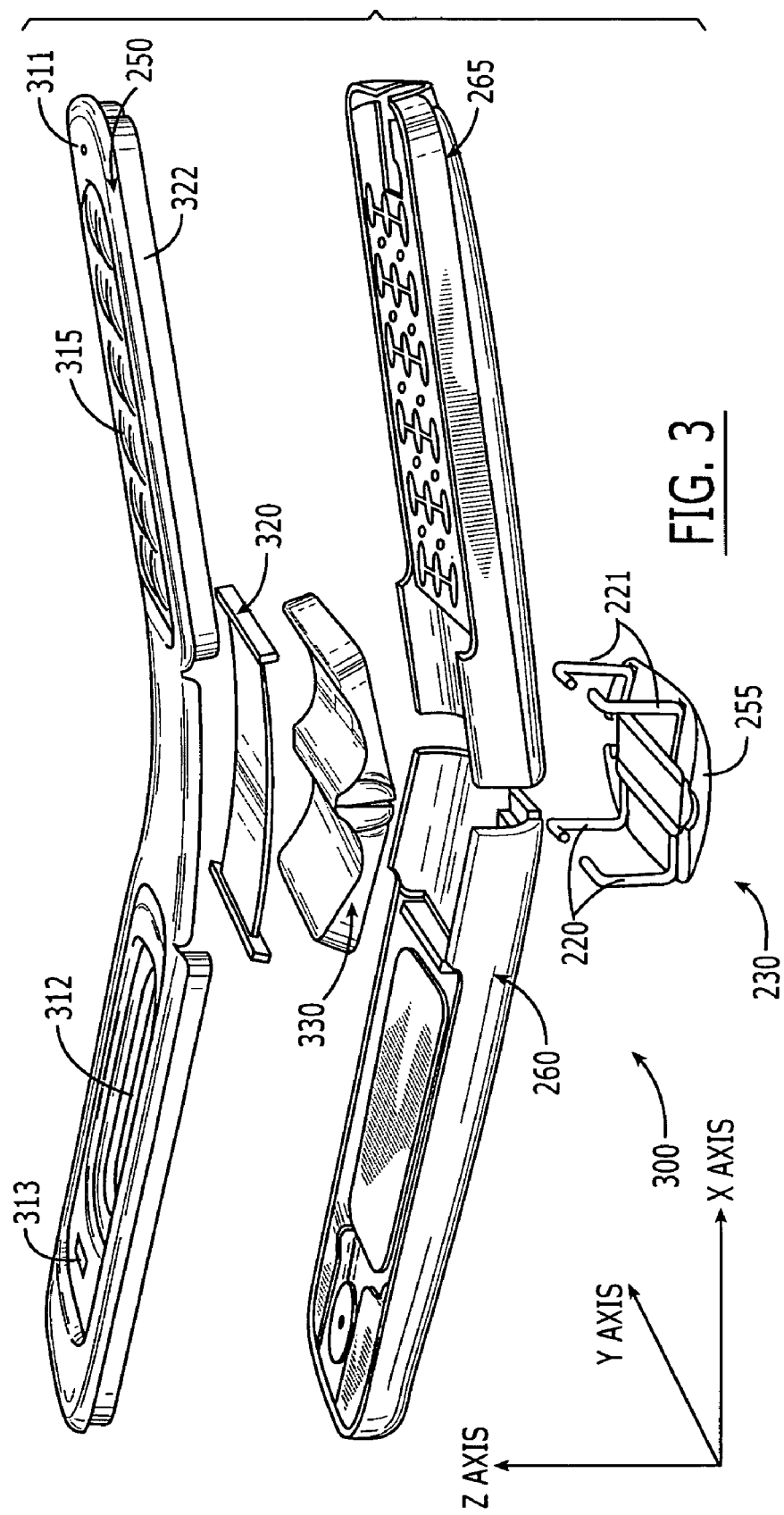

FIG. 3 is an exploded view showing several internal hinge components of a mobile station 300 in accordance with one embodiment of the present invention. The depicted mobile station 300 comprises a flexible cover 250, a flexible circuit connector 320, a folding hinge 330, a first body unit 260, a second body unit 265, and a tension unit 230. In the depicted embodiment, the first and second body units 260, 265 include a plurality of relatively delicate operational elements (e.g., a display 312, a keypad 315, a speaker port 313, a microphone port 311, etc.) that are disposed on or integral to the flexible cover 250. Accordingly, as the first and second body units 260, 265 are disposed adjacent one another in the folded position (shown in FIGS. 2A–2D) the plurality of operational elements are protected from potentially damaging impact or contact with foreign substances. Although FIGS. 3–4 depict certain operational elements adjacent either the first or second body units 260, 265 it is important to note that the present invention is not limited to the depicted configuration, and in fact, the various elements may be disposed adjacent either the first or body units 260, 265 as known in the art.

Body units 260 and 265 may be referred to as the mobile station's engines or, alternatively, the mobile station's first and second functional units. In one embodiment a flexible circuit connector 320 connects the operational elements housed within the body units 260, 265 in a manner known to those skilled in the art. In the depicted embodiment, the flexible cover 250 spans the body units 260, 265 while concealing the flexible circuit connector 320. In various embodiments, the flexible cover 250 protects the flexible circuit connector 320 from bending too sharply or kinking, by forming an internal radius around which the flexible circuit connector 320 is manipulated when the mobile station is folded. In one embodiment, the flexible cover 250 may be constructed of an elastomeric polymer to provide enhanced flexibility. In another embodiment, the flexible cover 250 may be constructed through 3D printing techniques such as those proposed by Vivek Subramanian's work on flexonics at the University of California at Berkeley. Vivek Subramanian, (visited Jul. 28, 2003) <http:// www-device.eecs.berkeley.edu/~viveks/pubs.htm>. In either of the embodiments referenced above, the flexible cover 250 may be attached to the body units 260, 265 by any means currently known, such as adhesive bonding, in-molding, metal or other rigid inserts, and the like.

In another embodiment of the present invention, a mobile station 300 may employ a flexible cover 250 that includes a plurality of ZEBRA® connector areas 322 constructed therewithin. As will be apparent to one of ordinary skill in the art, ZEBRA® connectors are flexible layered elastomeric connectors. Such ZEBRA® connector areas 322 could be used to prevent the flexible circuit connector 320 from having to carry the full electrical load of the mobile station 300. In another preferred embodiment of the present invention, the ZEBRA® connectors 322 may replace the flexible circuit connector 320 entirely by carrying all electrical signals between the first and second body units 260, 265. Accordingly, the utility provided by the flexible circuit connector 320 and the flexible cover 250 could be combined into a single functional cover (not shown) other flexible cover 250 embodiments may include simpler, conventional electrical connectors as known in the art.

In alternate embodiments, the functional cover, as with the flexible cover 250 for that matter, could be designed with quick release electrical connectors (not shown) so as to be readily replaceable. Thus, a user having selected a particular style of mobile station could potentially change the look and feel of the mobile station by replacing the functional cover and/or flexible cover. In addition, the body units 260, 265 too, could be manufactured so as to be replaceable. Again, by providing quick release fasteners (not shown) the polymer shells that generally comprise the body units 260, 265 could be readily replaceable. Accordingly, users could purchase a number of such body units 260, 265 for use in customizing the appearance and potential functionality of the mobile station.

Hinge assemblies in accordance with several embodiments of the present invention may comprise a folding hinge 330 mechanically attached to the first and second body units 260, 265 as shown, or, alternatively, may include body units 260, 265 having an integral folding hinge 330 (not shown). As referenced above, hinge assemblies according to various embodiments of the present invention rely on tension units 230 for biasing the first and second body units 260, 265 between open and folded positions. Such units 230 significantly reduce manufacturing costs by eliminating several complex internal components and by streamlining the mobile station design. Additionally, tension units 230 accommodate a simplified z-axis assembly, wherein the mobile station components (e.g., the first and second body units 260, 265, the folding hinge 330, the flexible connector 320, and the flexible cover 250) are advantageously built one atop the other in the z-axis direction. In contrast, when manufacturing the prior art hinges described above, an assembler must maneuver components along all axes, if such movement is possible given space considerations, in order to snake the flexible ribbon cable 185 through various channels formed by the internal hinge components. To make conventional assembly processes more difficult, the hinge pin 180 must be inserted through the spring-loaded internal biasing detents 184, while the entire assembly is under tension.

To summarize, tension units 230 according to various embodiments of the present invention provide a vastly improved ergonomic design. The tension units 230 may be quickly and efficiently assembled by fixing the folding hinge 330 in place, adding the electrical circuit connector 320, and then attaching mounting structures 220, 221 to the first and second body units 260, 265. In this regard, the mounting structures 220, 221 are generally attached to the first and second body units 260, 265 by inserting distal portions of the mounting structures 220, 221 into corresponding attaching slots that are covered by one or more attachment plates 210. As referenced above, the one or more attachment plates 210 prevent detachment of the mounting structures 220, 221. In addition to its structural and biasing functions, the tension unit 230 may also provide a novel interface for accessories such as wearables, car holders, desk stands, etc. For example, in one embodiment, the tension unit 230 may include a clip, hook, tab or other similar device (not shown) for affixing portable mobile station to a user's belt or a docking station. With regard to the latter embodiment, the tension unit 230 may include one or more electrical connectors (not shown) for connecting to a power source, battery charger or other similar device provided within the docking station as known in the art. In addition to the functional properties above, the tension unit 230 also provides aesthetic benefit as it provides a uniquely continuous visual line when the product is folded.

FIGS. 4A, 4B, 4C and 4D depict orthographic and perspective views of an "open" mobile station 200 constructed in accordance with preferred embodiments of the present invention. The flexible cover 250 includes a display 312 that may be integrated into the flexible cover 250 or may alternatively be mounted integral to the first body unit 260. In the latter embodiment, the flexible cover 250 would simply provide a cutout or transparent cover that, when assembled, would be aligned with the integral display (not shown) that is attached or integral to the first unit 260. In the former embodiment, the flexible cover 250 could be designed such that the cover material itself produces the display. For example, display portions such as those illustrated by reference numbers 317, 312, and 315 may be provided via active materials capable of flexible display such as those provided by E-Ink (Cambridge, Mass.) or OLED materials. Additionally, these areas may also provide touch input or haptic output with materials such as EMFiT®, which is available from Emfitech Ltd. of Vaajakoski, Finland. EMFiT® is an elastic, permanently charged electret film that converts mechanical stress into proportionate electrical energy, and conversely, mechanically expands when voltages of opposite polarities are applied.

As with the displays discussed above, the speaker port 313 and the microphone 311 may be embedded into the flexible cover 250 or alternatively, the cover could merely have openings to provide access to these components, which could be integrated within body units 260, 265. In mobile phone applications, such openings would additionally allow sound to travel to and from the microphone and speaker respectively.

In one embodiment, a portion of the flexible cover 250 may be designated as a fold area 317, which is designed to encourage the foldable hinge 330 to flex properly at the desired point. The fold area 317 may be narrowed, necked down, or crimped at or near the axis or axes of rotation. Also shown is an interface area 270 for connecting the mobile station 200 to external devices such as, chargers, computers, hands-free kits, etc. The connection may be through conductive, optical transmission, inductive near field transmission or short range wireless transmissions such as Bluetooth, RFID, 802.11 and the like.

Figure 5:
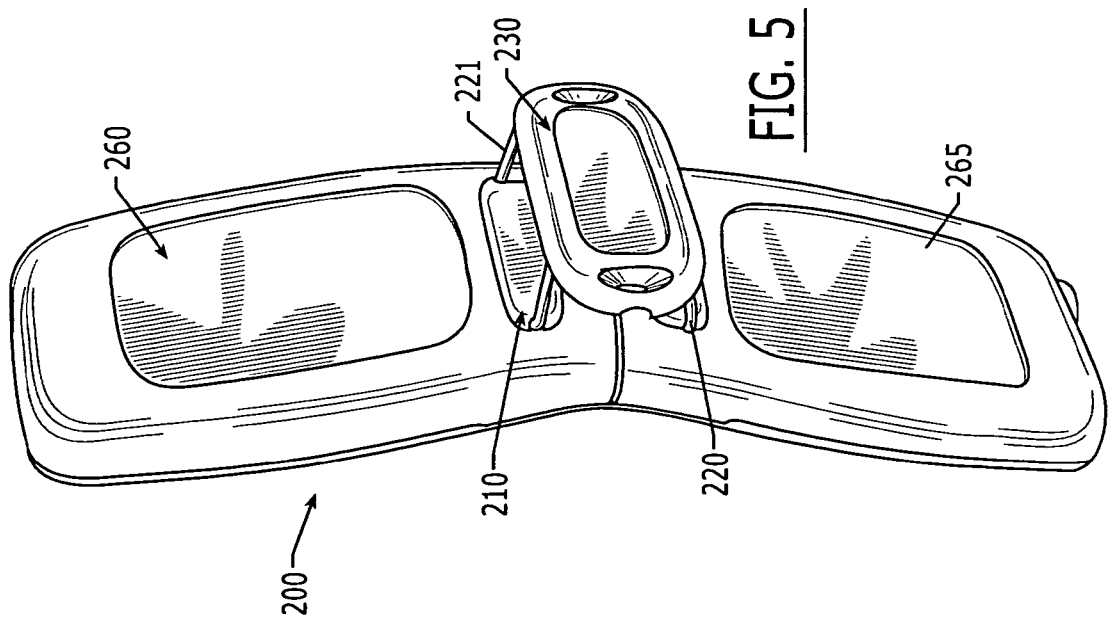
FIG. 5 is a posterior view of an "open" mobile station in accordance with one preferred embodiment of the present invention.

Turning to FIG. 5, a rear view of a mobile station built in accordance with embodiment of the invention is illustrated. The depicted mobile station 200 is placed in an open position to illustrate one preferred mounting orientation of one tension unit 230 embodiment. Specifically, the tension unit 230 attaches to the first and second body units 260, 265 via mounting structures 220, 221. The mounting structures 220, 221 may be fixed to the respective body units 260, 265 by attachment plates 210. In various embodiments, the tension unit 230 may include one or more apertures as shown. Such apertures may be provided to compliment the aesthetic appearance of the mobile station, to reduce the weight of the tension unit 230, to provide external access to various internal parts (e.g., mounting structures 220, 221, connector ports, LED displays and the like), or to provide means for docking station attachment.

Figure 6:
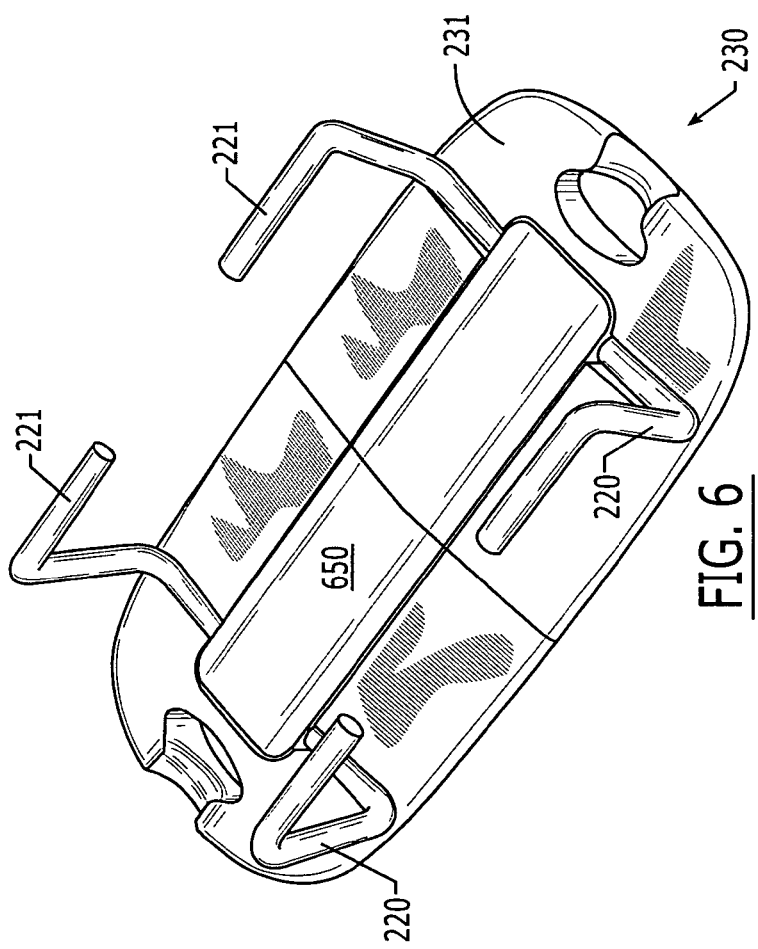
FIG. 6 depicts a tension unit in accordance with one preferred embodiment of the present invention.

FIG. 6 provides a detail view of the tension unit 230 embodiment depicted in FIG. 5. Specifically shown, is a tension unit 230 comprised of a body portion 231 and mounting structures 220 and 221, which may have cylindrical cross section, may be pressed from flat stock, produced as a molded integral unit or otherwise manufactured as commonly known in the art. In one embodiment, for example, the mounting structures 220, 221 are formed of a resilient metal, such as spring steel. Each mounting structure generally extends from a proximal end that is engaged by the body portion 231 of the tension unit 230 to a distal end that is engaged by the first and second body units 260, 265. Although the ends of each mounting structure may be engaged in various manners, the proximal ends of the mounting structures are disposed in a central cavity defined by the body portion 231 and secured therein by a cover 650. The cover 650, in turn, may be secured to the body portion 231 in any desired manner including by adhesive or by a snap-fit engagement. In order to reduce the size or profile of the tension unit 230, the body portion 231 can define slots leading into the central cavity for receiving medial portions of the mounting structures 220, 221 as shown.

As shown in FIG. 5, the distal ends of the mounting structures 220, 221 may be disposed in corresponding attaching slots defined by the exterior of the first and second body units 260, 265. The attaching slots (and attached mounting structures) are covered with one or more attachment plates 210 such that the distal ends of the mounting structures 220, 221 are secured within the attaching slots. As with the cover 650 referenced above, the attachment plates 210 may be secured to the first and second body units 260, 265 in any desired manner including adhesive, snap-fit engagement or the like.

Although the mounting structures 220, 221 are shown to be distinct, the proximal and/or the distal ends of mounting structure 220 may be joined by a connecting member (not shown), and the proximal and/or distal ends of mounting structure 221 may be joined by a connecting member (not shown). For example, the mounting structures may be C-shaped bands having distal ends configured to engage the first and second body units and a median region defined therebetween. The median region is coupled to the body of the tension unit and the distal ends of the mounting structures 220, 221 may be attached to the first and second body units 260, 265 in a variety of techniques known in the art, in addition to those referenced above.

Figure 7:
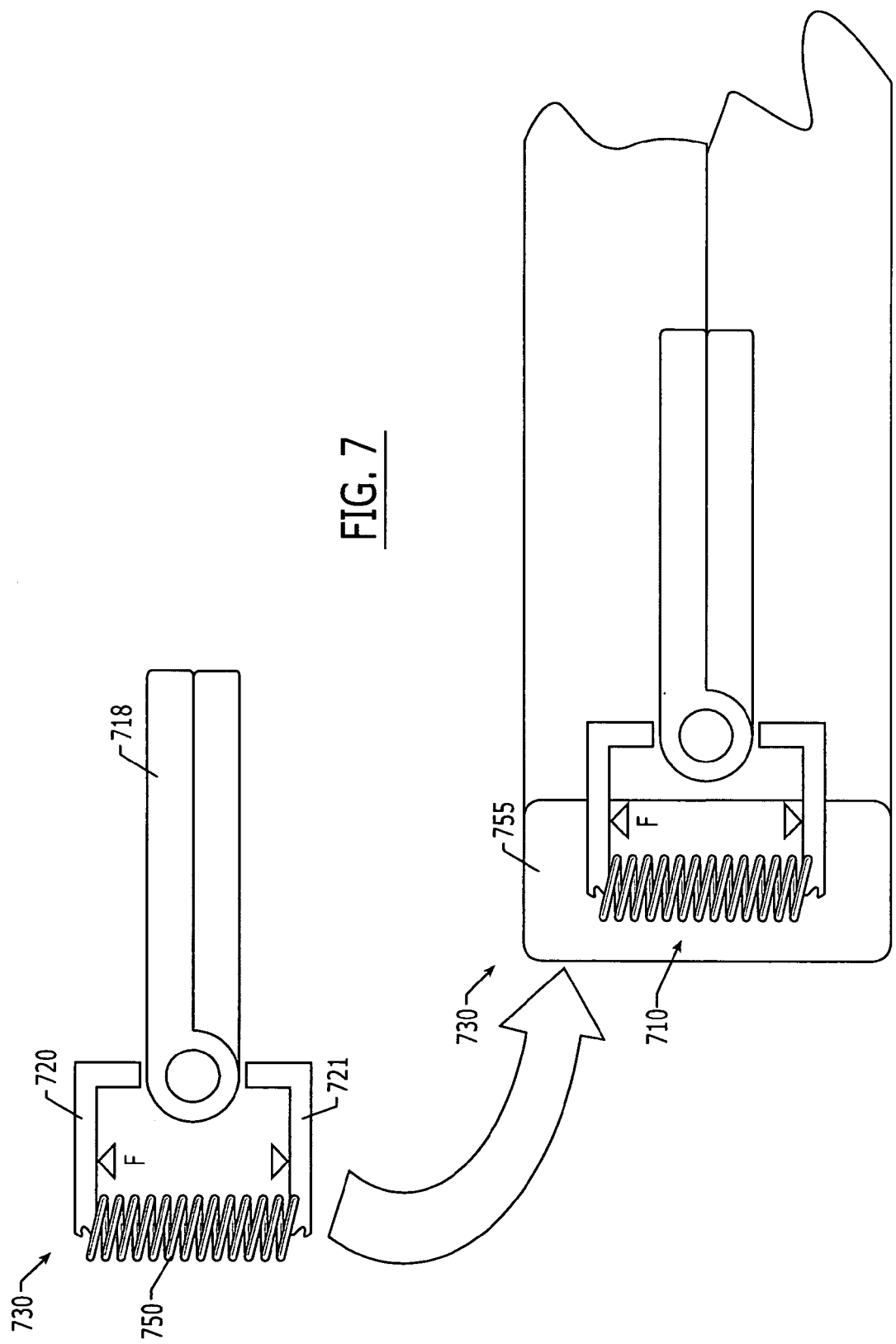
FIG. 7 illustrates exemplary tension mechanics used in a tension unit according to one embodiment of the present invention.

The tension unit 230 may also generally include a spring or other tension device or mechanics within the central cavity. As described below, the spring or other tension device serves to connect mounting structure 220 and mounting structure 230 so as to facilitate opening and closing of the mobile station. In this regard, FIG. 7 illustrates a compression spring in accordance with the one embodiment of the present invention. The springs provided are not intended to be limiting and other types of springs or tension devices may be employed. In the depicted example, a tension unit structure 730 comprises two mounting structures 720, 721. The mounting structures 720 and 721 are moveably coupled by a spring 750 that is disposed in the central cavity defined the body portion 731 of the tension unit structure. The spring 750 provides a resistant force F to the mounting structures 720, 721.

Figure 8:
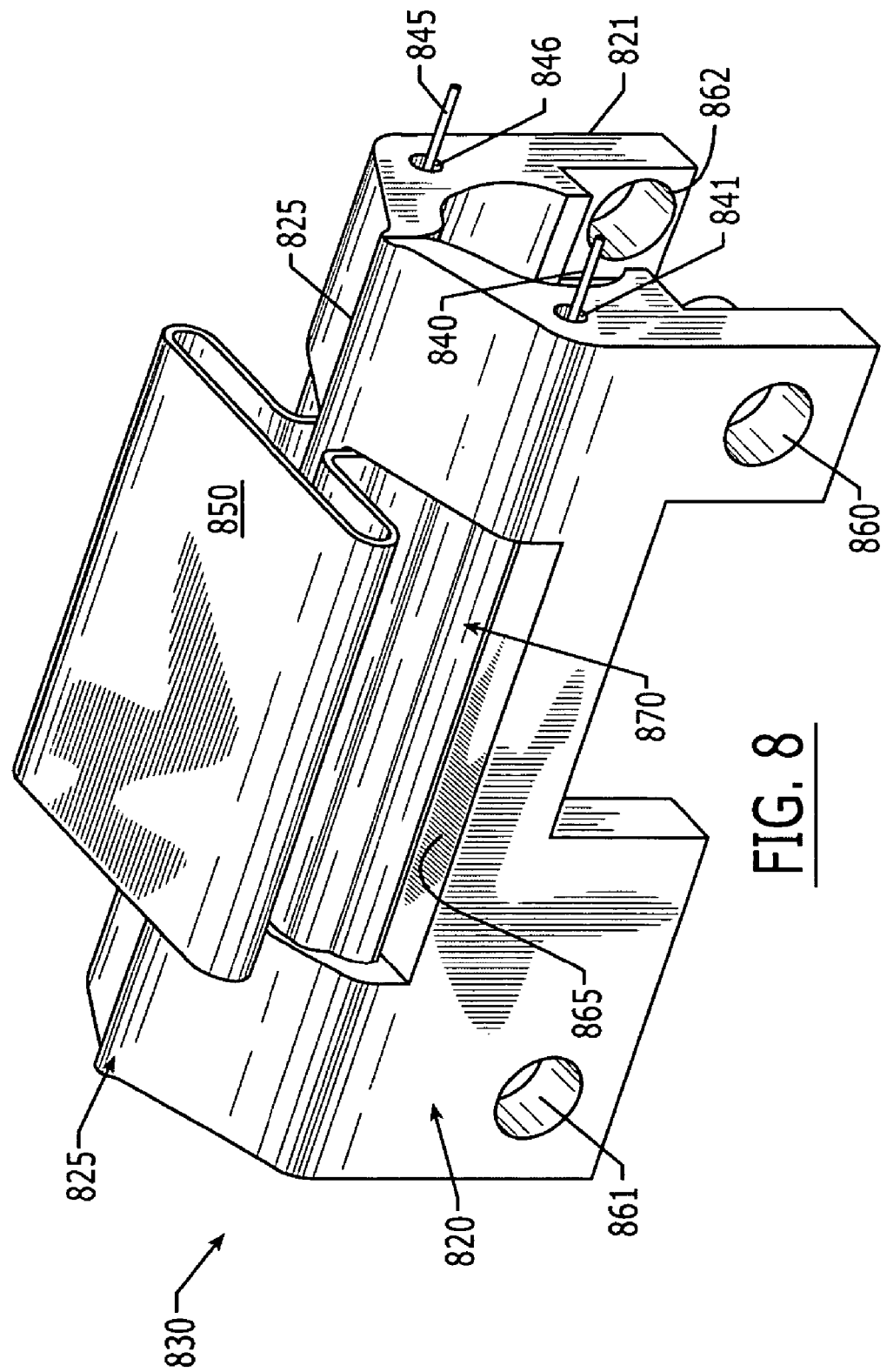
FIG. 8 illustrates a tension unit incorporating a C-spring in accordance with another embodiment of the present invention.

FIG. 8 illustrates another embodiment of a tension unit 830 in accordance with the present invention. Specifically, a C-spring tension unit 830 is provided having a more robust and durable structure than the tension units according to various other embodiments. In one embodiment, this durability is provided, inter alia, by a C-spring 850 that is attached to a hinge 820 by two shafts 840, 845. The shafts 840, 845 extend through channels 841, 846 and also through similar channels or loops 870 formed in the hinge 820 and in the opposite side of the C-spring 850. A slot 865 may be provided to accommodate a recessed placement of the C-spring 850 within the hinge assembly 820 as shown. The C-spring tension unit 830 may be mounted to first and second body units 260, 265 by fasteners (not shown) through mounting holes 860, 861. There are similar mounting holes 862 on posterior side of the hinge 821 as shown.

Figure 9:
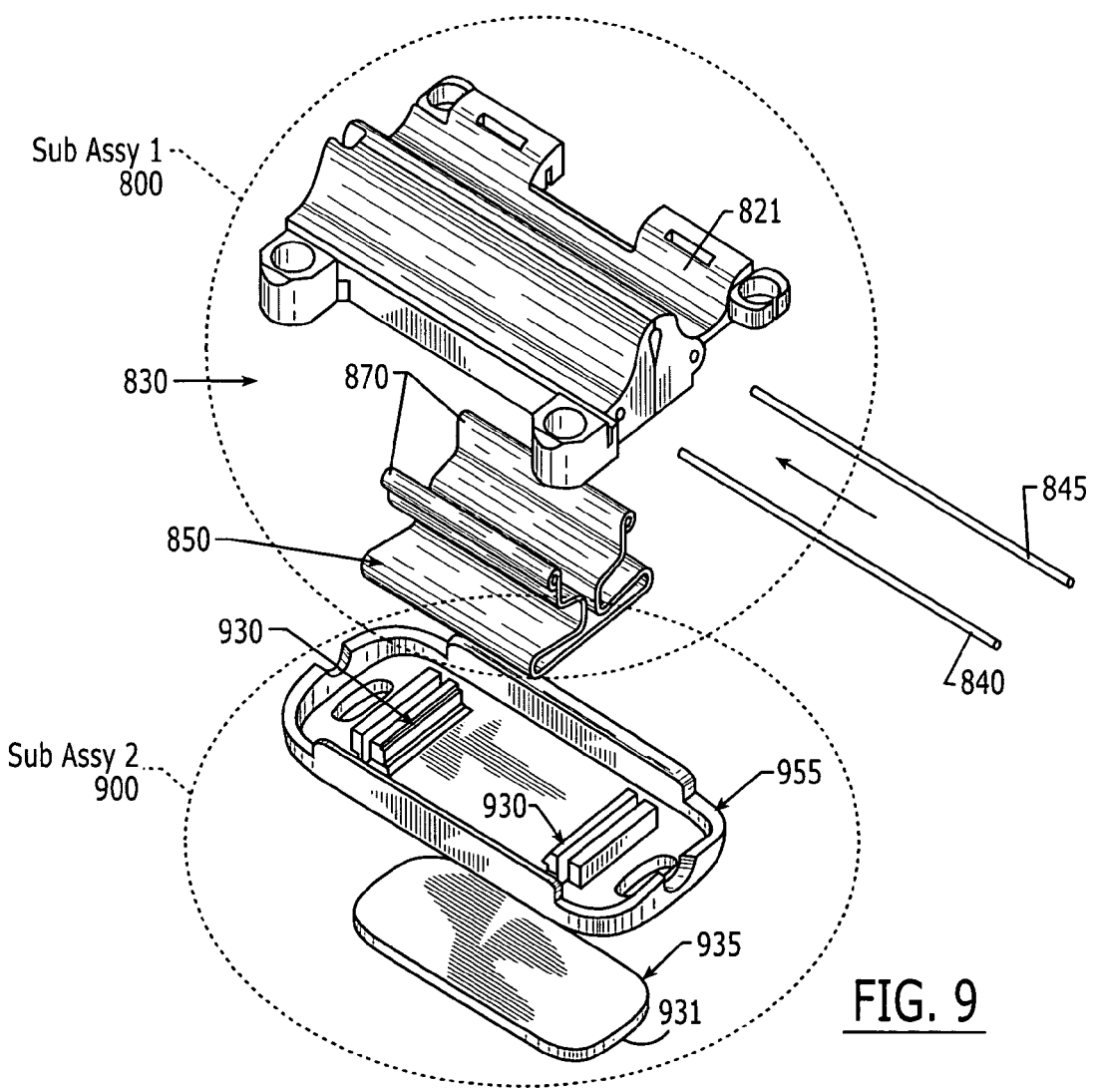
FIG. 9 illustrates a preferred hinge assembly in accordance with one embodiment of the present invention.
Figure 10:
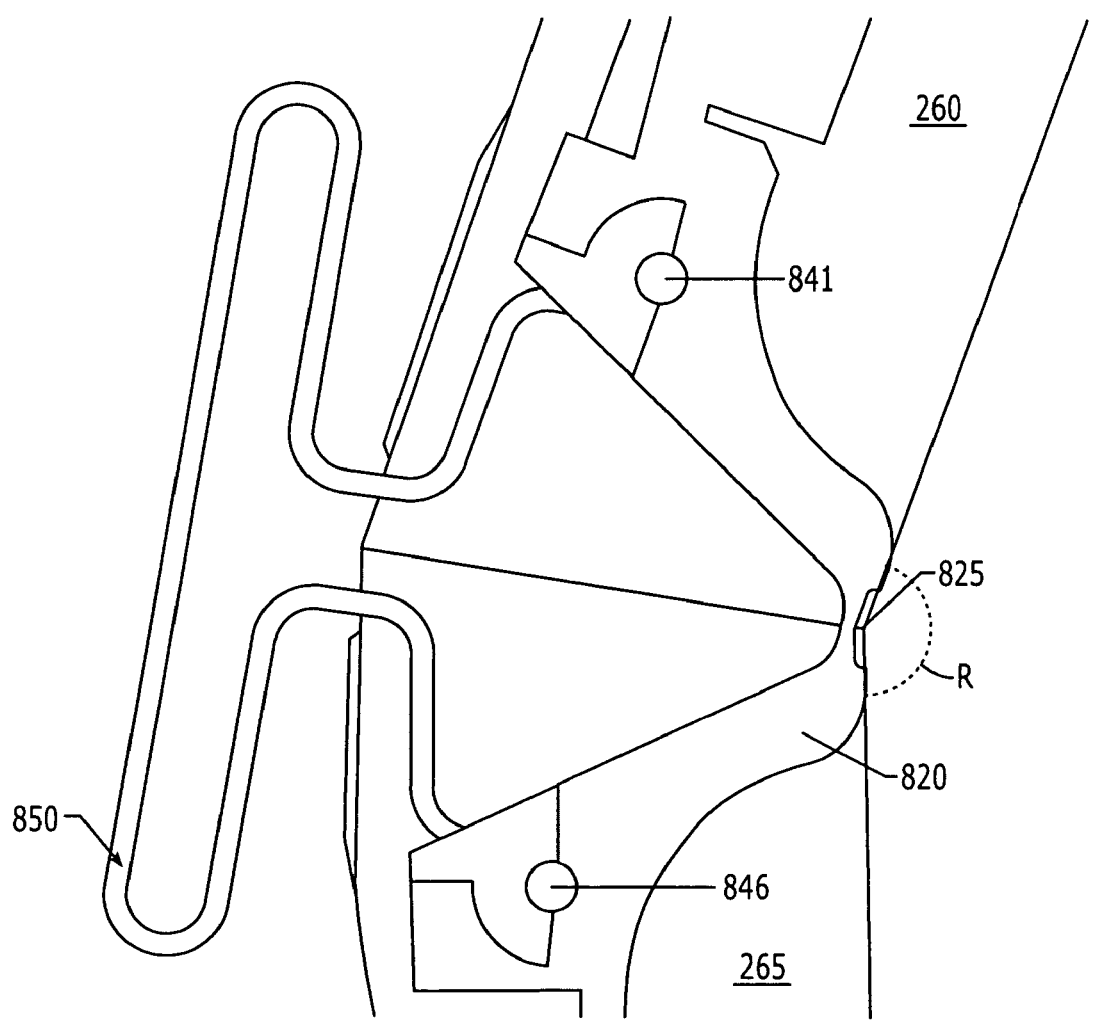
FIG. 10 is an illustration of the pivot axis of a hinge assembly in accordance with one embodiment of the present invention.

FIG. 9 provides a further detailed illustration of the hinge assembly depicted in FIG. 8. Notably, as will be apparent to one of ordinary skill in the art, FIG. 8 depicts the hinge assembly in a folded position while FIG. 9 depicts the hinge assembly in an extreme open position. FIG. 9 depicts two subassemblies. The first subassembly 800 generally consists of the C-spring tension unit 830 described above. According to the depicted embodiment, the C-spring 850 attaches to a folding hinge 820 via shafts 840 and 845. In this regard, the shafts extend through the channels 841, 846 defined by the folding hinge 820, as well as through corresponding channels or loops 870 extending lengthwise along opposite sides of the C-spring 850. The second subassembly 900 generally consists of a back plate 955 attached to the C-spring 850 in accordance with yet another embodiment of the present invention. The back plate 955 may be attached to the C-spring 850 via various methods known in the art. One preferred method of attachment is shown, wherein tongued structures 930 provided on the back plate 955 are slipped onto a flat portion of spring 850 such that opposed edges of the spring are engaged by the corresponding tongued structures 930. A surface 931 for placement of a logo or other display may be provided on a display plate 935 that attaches or is otherwise adhered to, or is perhaps integral to back plate 955. In other embodiments, the backplate and display plate may be provided as an integral structure (not shown) as know in the art FIG. 10 is a section view of a mobile station hinge in accordance with one embodiment of the present invention. As referenced above, the folding hinge 820 defines channels 841, 846 for receiving shafts (shown in FIG. 9) that attach the hinge to the spring 850 or other tension unit embodiment (not shown). In one embodiment, the folding hinge 820 is a relatively V-shaped hinge as shown, thus, defining a distinct pivot axis 825 inwardly adjacent the inner surfaces of the first and second body units 260, 265 of the mobile station as shown. For the purposes of the present specification and appended claims the term "inwardly adjacent" refers to position offset from the intersection of the inner surfaces of the first and second body units 260, 265 of the mobile station in a direction extending generally toward the tension unit 850. As will be apparent to one of ordinary skill in the art, the depicted configuration is preferable to conventional barrel or piano-type hinge assemblies that necessarily form a semi-cylindrical ridge along dashed line R and, thus, necessarily reduce the amount of usable space provided on the interior of the mobile station. The elimination of such semi-cylindrical ridges R also accommodates a relatively planar and continuous flexible cover (shown as 250 in FIG. 3). As referenced above, in various embodiments of the present invention, such covers may be printed in the folded area (317 in FIG. 4C) to include visual indicia such as logos, printed electrical circuits, and the like, whereas under conventional hinge designs such printing would not have been possible.

Figure 11A:
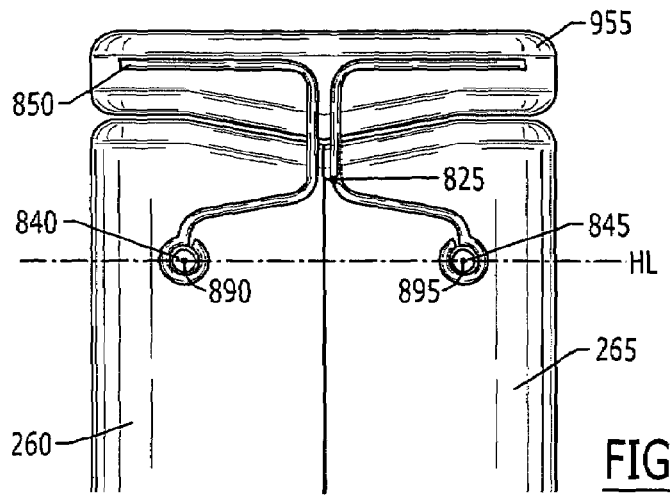
FIG. 11A illustrates the relative orientation of a back plate when attached to a hinge assembly of a "closed" mobile station according to one embodiment of the present invention.
Figure 11B:
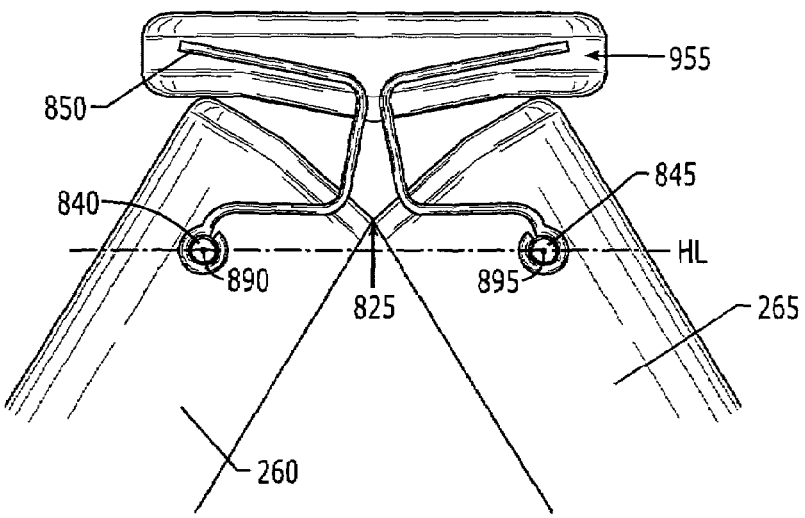
FIG. 11B illustrates the relative orientation of the back plate when attached to a hinge assembly of a "midway opened" mobile station according to one embodiment of the present invention.
Figure 11C:
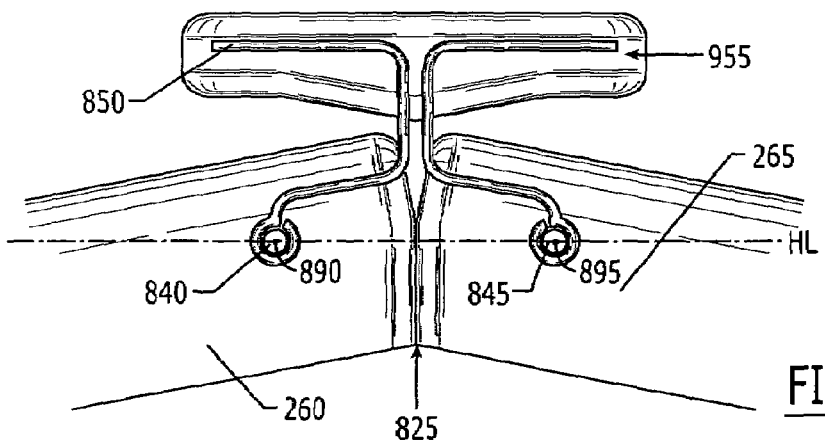
FIG. 11C illustrates the relative orientation of the back plate when attached to a hinge assembly of an "open" mobile station according to one embodiment of the present invention.

FIGS. 11A, 11B, and 11C illustrate the relative orientation of the back plate 955 of the hinge assembly when the mobile station is placed in various positions. A simplified representation of the relative movement of the spring 850, the shafts 840, 845, the body units 260, 265 and the pivot axis 825 are further provided.

FIG. 11A illustrates the relative orientation of the back plate 955 of a preferred hinge assembly when the improved mobile station is placed in a folded position. FIG. 11B illustrates the relative orientation of the back plate 955 when the mobile station is placed in a midway open position. FIG. 11C illustrates the relative orientation of the back plate 955 when the mobile station is in the open position. The precise functionality of the improved hinge assembly will become apparent to one of ordinary skill in the art after reviewing FIGS. 11A, 11B, and 11C. Of particular note, is the relationship between the pivot axis 825 and the line HL extending through spring pivot points 890, 895. The placement of spring pivot points 890, 895 generally coincides with the position of the center axis of shafts 840, 845. In FIG. 11A for example, the mobile station pivot axis 825 resides substantially above spring pivot points 890 and 895. As the mobile station transitions to the midway open position as illustrated in FIG. 11B, the pivot axis 825 is more closely aligned horizontally with the spring pivot points 890, 895. Finally, in the open position illustrated in FIG. 11C, the pivot axis 825, resides substantially below the spring pivot points 890, 895. Accordingly, as the improved mobile station of the present invention is opened, the pivot axis 825 falls from above, to substantially below the relative position of spring pivot points 890, 895. As the mobile station closes, the reverse process occurs, wherein the pivot axis 825 returns to a final folded position substantially above the spring pivot points 890, 895.

FIGS. 12A and 12B provide a geometrical representation of the movements described in FIGS. 11A, 11B and 11C. In FIGS. 12A and 12B, the spring pivot points 890, 895 are designated as spring pivot points P1, P2. The length L describes the distance between the respective spring pivot points P1, P2 and the back plate 955 attachment points B1, B2. As the mobile station is opened and folded, the spring pivot points P1, P2 are directed along arcs 1245, 1240. The top points T1, T2 or apex of the spring pivot points' P1, P2 rotation (i.e., arcs 1245, 1240) about the pivot axis 825 may be derived by extending a vertical line (90 degrees from horizontal line "CL") from hinge pivot axis 825 until the line intersects arcs 1245, 1240. The points indicated by these intersections represent the apex of the respective arcs and are thereby designated as top points T1, T2. When the spring pivot points P1, P2 are below top points T1, T2 and to the right of pivot axis 825 as shown in FIG. 12A, the tension unit 230 holds or biases the body units 260, 265 together (i.e. in a folded position). In other words, force is required to advance body units 260, 265 past the top points T1, T2 into an open position. This force is stored in the spring as potential energy. Upon passing the midway point of the fold (top points T1, T2), the stored potential energy forces the body units 260, 265 into an open position. In short, the tension unit 230 according to various embodiments of the present invention biases the mobile station in both an open and folded positions, depending upon its position relative to the pivot axis 825. In addition, by providing a C-shaped spring, C-shaped bank, compression spring/mounting structure assembly or other similar devices that resists the vertical displacement of pivot points P1, P2, various embodiments of the present invention are maintained in either their open or folded positions.

Figure 13A:
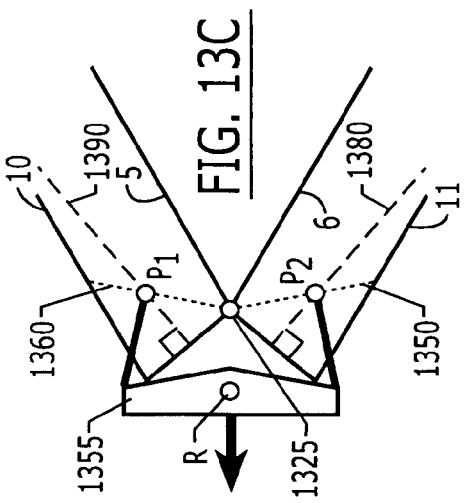
FIG. 13 illustrates the movement of the back plate relative to selected pivot points located on one embodiment of a mobile station according to the present invention.
Figure 13D:
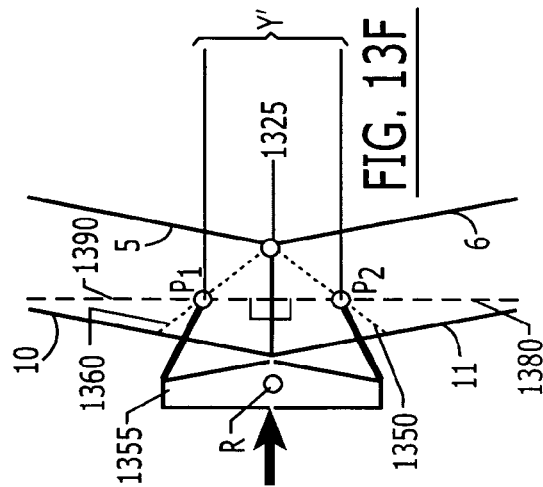
Figure 13B:
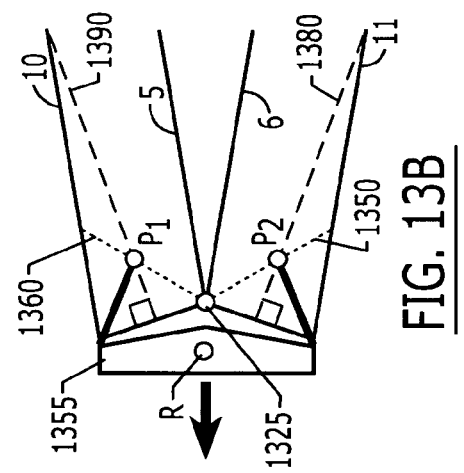
Figure 13E:
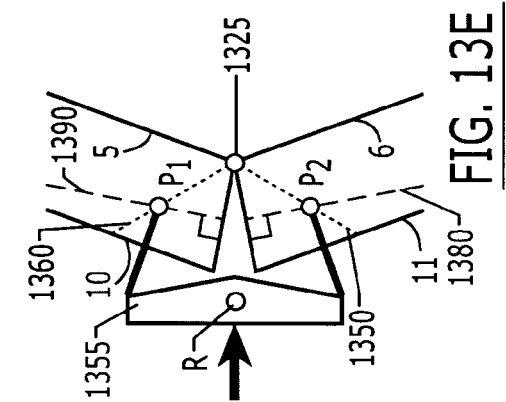
Figure 13C:
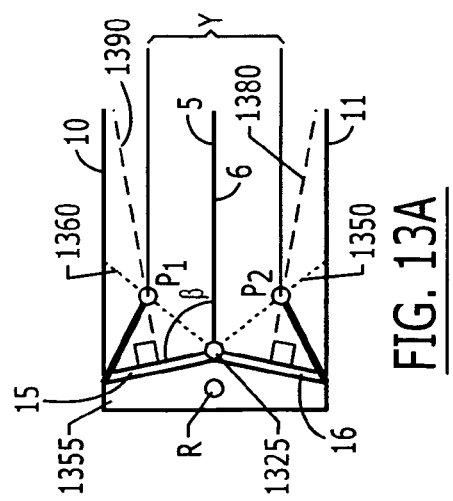
Figure 13F:
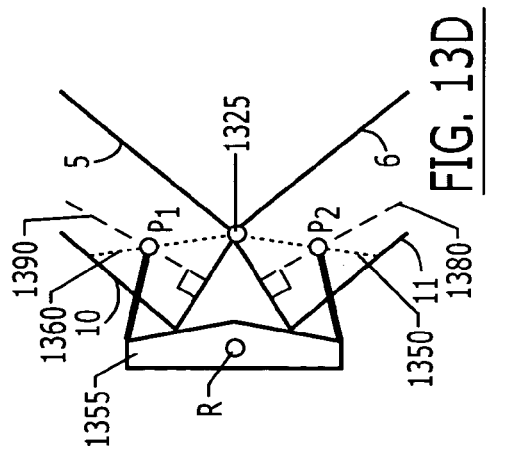

To ensure the mobile station is biased evenly as described above, and in order to fix the ultimate placement of the improved tension unit 230, angle bisecting lines 1350, 1360 and meridian lines 1380, 1390 may be constructed during the as shown in FIGS. 13A through 13F. For the purposes of the foregoing analysis, the first and second body units 260, 265 are symmetrical. Each body unit 260, 265 includes an inner surface 5, 6 an outer surface 10, 11 and an end surface 15, 16. Angle bisecting lines 1350, 1360 represent a series of positions wherein the spring may be attached to the body units, 260, 265 such that an equal biasing force may be maintained toward both the open and folded positions. By placing the spring pivot points P1, P2 on angle bisection lines 1360 and 1350, the spring has substantially the same shape (and therefore applies substantially the same force) when open and folded. To construct angle bisecting lines 1350, 1360 one merely provides a line bisecting angle β defined between the inner surface 5 and the end surface 15 of a given body unit 260 as shown. Pivot points P1, P2 placed along these lines travel in a uniform arcs as shown in FIGS. 13A–13E; thereby resulting in an equal vertical displacement Y, Y' in both the open and folded positions as shown in FIGS. 13A and 13E respectively. Thus, as known in the art, springs and other similar devices as described above apply an equal opening and folding force to the mobile station.

Meridian lines 1380, 1390 are constructed to control the location of the back plate 1355 relative to the pivot axis 1325 specifically, and the mobile station generally. The back plate 1355 will be equidistant from the pivot axis 1325 in both the open and folded positions if the spring pivot points P1, P2 are placed along the meridian lines 1380, 1390. Accordingly, the precise contour of the back plate 1355 may be designed to provide optimal fit in relation to the ends of the first and second body units of the mobile station as described below.

Meridian lines may be constructed by at least two methods. FIGS. 13A–13E depict meridian lines 1380, 1390 constructed by a first method, and FIGS. 14A–14C depict meridian lines 1413 constructed by a second method. The first method simply requires extending a perpendicular line 1380, 1390 from the end surface 15 of a given body unit 260. In the depicted embodiment, spring pivot points P1, P2 are placed at the intersection of angle bisecting lines 1350, 1360 and the meridian lines 1380, 1390. Accordingly, the depicted mobile station requires an equal opening and closing force and also includes a back plate 1355 that is equidistant from the pivot axis 1325 in both the open and folded positions.

FIGS. 14A through 14C illustrates a second method for constructing meridian lines 1380, 1390 according to yet another embodiment of the present invention. This second method is particularly advantageous when a gap G is provided between the back plate 1355 and the mobile station as shown. The second method involves designating a first reference point R on the back plate 1355 proximate to its center. The relative position of the first reference point R remains constant when the mobile station is placed in the open and folded positions. A distance d is determined between the first reference point R and the pivot axis 1325. An arm is extended from pivot axis 1325 along the line formed by end surface 16. The arm extends beyond outer surface 11 a distance d to define second reference point RP. Reference line 1412 is then drawn to connect the first reference point R and the second reference point RP. At the midpoint of line 1412 a perpendicular line is extended as shown in FIG. 14B, thereby forming a meridian line 1413. In one embodiment, angle bisecting line 1450 may be provided as described above to set spring pivot point P2 as shown. The above process is repeated for body unit 265 so as to produce a second meridian line and set spring pivot point P1 for symmetrical body unit 265.

As referenced above, in one embodiment, the pivot points P1 and P2 are set at the respective intersection of angle bisecting lines and meridian lines. As a result, the forces required to open and close the mobile station are substantially equal and the position of the back plate is substantially equidistant from the pivot axis in both the open and folded positions. In alternate embodiments, however, mobile station designers may wish to alter the above characteristics for various design considerations. For example, returning to FIG. 13A, one embodiment may be configured such that the pivot points P1, P2 are set along meridian lines 1380,1390 and off angle bisecting lines 1350, 1360. In particular, the pivot points P1, P2 could be moved axially rearward (toward the back plate 1355) to produce a mobile station having a required opening force that is less than its required closing force. Alternatively, the pivot points P1, P2 could be moved axially forward (away from the back plate 1355) to produce a mobile station having a required opening force that is greater than its required closing force. In other embodiments, the pivot points P1, P2 may remain along angle bisecting lines 1350, 1360 and instead be positioned off meridian lines 1380, 1390. In particular, the pivot points P1, P2 could be moved rearward along the angle bisecting lines (toward the pivot axis 1325) to produce a smaller gap G between tension unit and an opened mobile station. Alternatively, the pivot points P1, P2 could be moved axially forward (away from the back plate 1355) to produce a mobile station having a larger gap G between the tension unit and an opened mobile station. The above relationships between pivot point location and the angle bisecting and meridian lines may be used alone or in combination to produce multiple additional desirable embodiments as will be apparent to one of ordinary skill in the art.

FIGS. 15A and 15D illustrate the relative interaction between the back plate and the mobile station in accordance with various preferred embodiments of the present invention. As will be apparent to one of ordinary skill in the art, several configurations are possible for body units 260, 265 in order to accommodate an efficient fit with back plate 1555. The precise contour of the back plate 1555 may be dictated by the desired gap G provided between the back plate 1555 and the pivot axis 1525. For example, if a relatively small gap G is preferred the back plate 1555 should include a relatively broad radius at its interior ends as depicted in FIGS. 15B and 15C. Alternatively, if a relatively large gap G is desired, the back plate 1555 may include interior ends having a tighter or relatively smaller or radius as shown in FIGS. 15A and 15D. In various embodiments, the back plate 1555 may include a "squared" corner 1510 having little or no radius as shown in FIG. 15A. In another embodiment, the back plate 1555 may include interior corners 1520 having a relatively larger radius as illustrated in FIG. 15B. In another embodiment, the back plate 1555 may include "inverted squared" interior corners 1530 having squared cutouts as illustrated in FIG. 15C. In yet another embodiment, the back plate 1355 may include a relatively small radius defined by its interior corners as illustrated in FIG. 15D. Alternate filleted or chamfered cornered embodiments may also be provided as known to one of ordinary skill in the art.

It should be pointed out that these are illustrated embodiments only, and that the repeated presence or absence of a particular feature does not imply that it is a required component of the invention absent on explicit statement to that effect.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A foldable mobile station comprising:
a first functional unit;
a second functional unit;
a folding hinge coupling said first functional unit to said second functional unit; and
a tension unit comprising,
a body structured for combining with said first and second functional units to define a mobile station exterior surface, and
first and second resilient members extending from said body each having a pivotal coupling portion defined opposite said body,
wherein the pivotal coupling portions of said first and second resilient members pivotally attach said tension unit to said first and second functional units and at least intermittently apply a force thereto for biasing the foldable mobile station between folded and open positions, and
wherein the mobile station exterior surface is substantially contiguous in the folded position and substantially non-contiguous in the open position.

2. The foldable mobile station recited in claim 1, further comprising a flexible cover attached to an inner surface of said first functional unit and an inner surface of said second functional unit for providing a continuous surface therebetween.

3. The foldable mobile station recited in claim 1, further comprising a flexible cover attached to an inner surface of said first functional unit and an inner surface of said second functional unit for electrically connecting said first and second functional units.

4. The foldable mobile station recited in claim 3, wherein said flexible cover includes an outer edge providing a tactile gripping surface.

5. The foldable mobile station recited in claim 1, wherein said foldable mobile station includes a display disposed adjacent either said first or second functional units.

6. The foldable mobile station recited in claim 1, wherein said foldable mobile station includes a keypad disposed adjacent either said first or second functional units.

7. The foldable mobile station recited in claim 3, wherein said flexible cover includes one or more connectors positioned to contact said first and second functional units, thereby facilitating electronic communication between said first and second functional units.

8. The foldable mobile station recited in claim 7, wherein said one or more connectors are flexible elastomeric connectors.

9. The foldable mobile station recited in claim 1, wherein said folding hinge is integral to said first and second functional units.

10. The foldable mobile station recited in claim 1, wherein said tension unit is a C-shaped spring.

11. The foldable mobile station recited in claim 1, further comprising an outwardly facing protective shell and an inner protected surface, wherein the inner protected surface is accessible when the foldable mobile station is placed in the open position; and wherein the inner protected surface includes one or more operational elements.

12. The foldable mobile station recited in claim 11, wherein the outwardly facing protective shell defines slots and the pivotal coupling portions of said first and second resilient members engage the slots to pivotally attach said tension unit to said first and second functional units of said foldable mobile station.

13. The foldable mobile station recited in claim 1, further comprising a flexible circuit connector attached to said first and second functional units for providing electronic communication therebetween.

14. The foldable mobile station recited in claim 1, wherein said first functional unit comprises a speaker port and said second functional unit comprises a microphone port for facilitating oral communication by a user when said foldable mobile station is configured in the open position.

15. The foldable mobile station recited in claim 1, wherein said first functional unit defines a first inner surface and said second functional unit defines a second inner surface and wherein said folding hinge defines a pivot axis positioned inwardly adjacent an intersection defined between said first and second inner surfaces of said first and second functional units.

16. The foldable mobile station recited in claim 1, wherein:
said first functional unit defines an inner surface, an end surface, and a pivot axis defined therebetween; and
the pivotal coupling portion of the first resilient member of said tension unit engages said first functional unit along an imaginary angle bisecting line extending radially from said pivot axis to bisect an angle defined between said inner surface and said end surface of said first functional unit.

17. The foldable mobile station recited in claim 1, wherein:
said second functional unit defines an inner surface, an end surface, and a pivot axis defined therebetween; and
the pivotal coupling portion of said second resilient member of said tension unit engages said second functional unit along an imaginary angle bisecting line extending radially from said pivot axis to bisect an angle defined between said inner surface and said end surface of said second functional unit.

18. The foldable mobile station recited in claim 1, wherein:
said first functional unit defines an outer surface, an inner surface and an end surface proximate said tension unit; and
the pivotal coupling portion of said first resilient member of said tension unit engages said first functional unit along an imaginary meridian line extending axially and perpendicularly from a midpoint defined on said end surface halfway between said outer and inner surfaces.

19. The foldable mobile station recited in claim 1, wherein:
said second functional unit includes an outer surface, an inner surface and an end surface proximate said tension unit; and
the pivotal coupling portion of said second resilient member of said tension unit engages said second functional unit along an imaginary meridian line extending axially and perpendicularly from a midpoint defined on said end surface halfway between said outer and inner surfaces.

20. The foldable mobile station recited in claim 1, wherein:
said first functional unit includes an outer surface, an inner surface and an end surface proximate said tension unit, said folding hinge defines a pivot axis, said tension unit includes a first reference point located proximate the center of said body, and a distance is defined between said first reference point and said pivot axis; and
wherein the pivotal coupling portion of said first resilient member of said tension unit engages said first functional unit along an imaginary meridian line extending axially and perpendicularly from a midpoint of a reference line defined between said first reference point and a second reference point, said second reference point being defined by extending an end reference line outwardly said distance beyond said outer surface along the line defined by said end surface.

21. The foldable mobile station recited in claim 1, wherein:
said second functional unit includes an outer surface, an inner surface and an end surface proximate said tension unit, said folding hinge defines a pivot axis, said tension unit includes a first reference point located proximate the center of said body, and a distance is defined between said first reference point and said pivot axis; and
wherein the pivotal coupling portion of said second resilient member of said tension unit engages said second functional unit along an imaginary meridian line extending axially and perpendicularly from a midpoint of a reference line defined between said first reference point and a second reference point, said second reference point being defined by extending an end reference line outwardly said distance beyond said outer surface along the line defined by said end surface.

22. A tension unit for use in a foldable mobile station having first and second functional units, comprising:
a body structured for combining with said first and second functional units to define a mobile station exterior surface; and
first and second resilient members each extending from said body and each having a pivotal coupling portion defined opposite said body;
wherein the pivotal coupling portions of said first and second resilient members pivotally attach said tension unit to said first and second functional units of the mobile station and at least intermittently apply a force thereto for biasing said first and second functional units of the foldable mobile station between an open position and a folded position, and
wherein the mobile station exterior surface is substantially contiguous in the folded position and substantially non-contiguous in the open position.

23. The tension unit of claim 22, wherein:
said tension unit is comprised at least in part of spring steel.

24. The tension unit of claim 22, wherein:
said body defines a cavity for at least partially enclosing a compression spring coupled at either end to said two of more mounting structures.

25. The tension unit of claim 22, wherein:
said body is configured to include at least one display surface.

26. The tension unit of claim 25, wherein:
said at least one display surface is configured to include visual indicia.

27. The tension unit of claim 25, wherein:
said at least one display surface is configured to include an electronic display.

28. The tension unit of claim 22, wherein:
said tension unit includes an electrical connector for connecting said foldable mobile station to a power supply.

29. The tension unit of claim 22, wherein:
said tension unit includes a docking coupler for coupling said foldable mobile station to a docking station.

30. A tension unit, comprising:
a body;
two or more mounting structures extending from said body for engaging and thereby biasing first and second functional units of a foldable mobile station between an open position and a folded position, wherein said two or more mounting structures are C-shaped resilient bands having first and second ends and a median region disposed therebetween, wherein said median region of said C-shaped resilient bands are coupled to said body, said first end of said C-shaped resilient bands engage said first functional unit and said second end of said C-shaped resilient bands engage said second functional unit.

31. The tension unit of claim 30, wherein:
said C-shaped resilient bands are comprised at least partially of spring steel.

32. The tension unit of claim 30, wherein:
said body is comprised at least partially of a polymer.

33. A method of assembling a foldable mobile station comprising:
pivotally coupling a first functional unit to a second functional unit via a folding hinge;
forming a tension unit comprising a body structured to combine with the first and second functional units to define a mobile station exterior surface;
providing first and second resilient members extending from the body each having a pivotal coupling portion defined opposite the body; and
pivotally coupling the pivotal coupling portions of the first and second resilient members to the first and second functional units respectively for biasing the first and second functional units between open and folded positions wherein the mobile station exterior surface is substantially contiguous in the folded position and substantially non-contiguous in the open position.

34. The method of assembling a foldable mobile station as recited in claim 33, further comprising the step of electrically connecting said first and second functional units.

35. The method of assembling a foldable mobile station as recited in claim 33, further comprising the step of electrically connecting said first and second functional units via a flexible electrical connector.

36. The method of assembling a foldable mobile station as recited in claim 33, wherein:
said step of pivotally coupling a tension unit includes providing a tension unit comprised of a C-shaped spring.

37. The method of assembling a foldable mobile station as recited in claim 33, wherein:
said step of pivotally coupling a tension unit includes providing a tension unit comprised of a body having two or more mounting structures extending therefrom, wherein said mounting structures are configured for engaging said first and second functional units.

* * * * *